(No Model.)

D. T. MERRICK, W. T. COYLE & W. L. BAILEY.
PLANT SPRINKLER.

No. 306,508. Patented Oct. 14, 1884.

WITNESSES
Jno. R. Young,
Alex Mahon

INVENTORS
David T. Merrick
Walter T. Coyle
William L. Bailey
per H. N. Jenkins
Attorney

United States Patent Office.

DAVID THOMAS MERRICK AND WALTER TURNBULL COYLE, OF MERRICK, AND WILLIAM LORIN BAILEY, OF SIMMESPORT, LOUISIANA.

PLANT-SPRINKLER.

SPECIFICATION forming part of Letters Patent No. 306,508, dated October 14, 1884.

Application filed March 1, 1884. (No model.)

*To all whom it may concern:*

Be it known that we, DAVID T. MERRICK and WALTER T. COYLE, citizens of the United States, and residents of the town of Merrick, parish of Pointe Coupée, and WM. L. BAILEY, a citizen of the United States, and a resident of Simmesport, in the parish of Avoyelles, and State of Louisiana, have invented a certain new and useful Improvement in Plant-Sprinklers; and we do hereby declare the following to be a full, clear, and correct description of the same, reference being had to the annexed drawings, making a part of this specification.

This invention relates to a sprinkling-wagon having a box or reservoir for containing poisonous liquid, the said reservoir provided with agitators, which are connected with the axle of the wagon, as hereinafter described, so that the movement of the wagon will operate the agitators, by which means the liquid is thoroughly mixed before and as it is being discharged therefrom.

Figure 1:
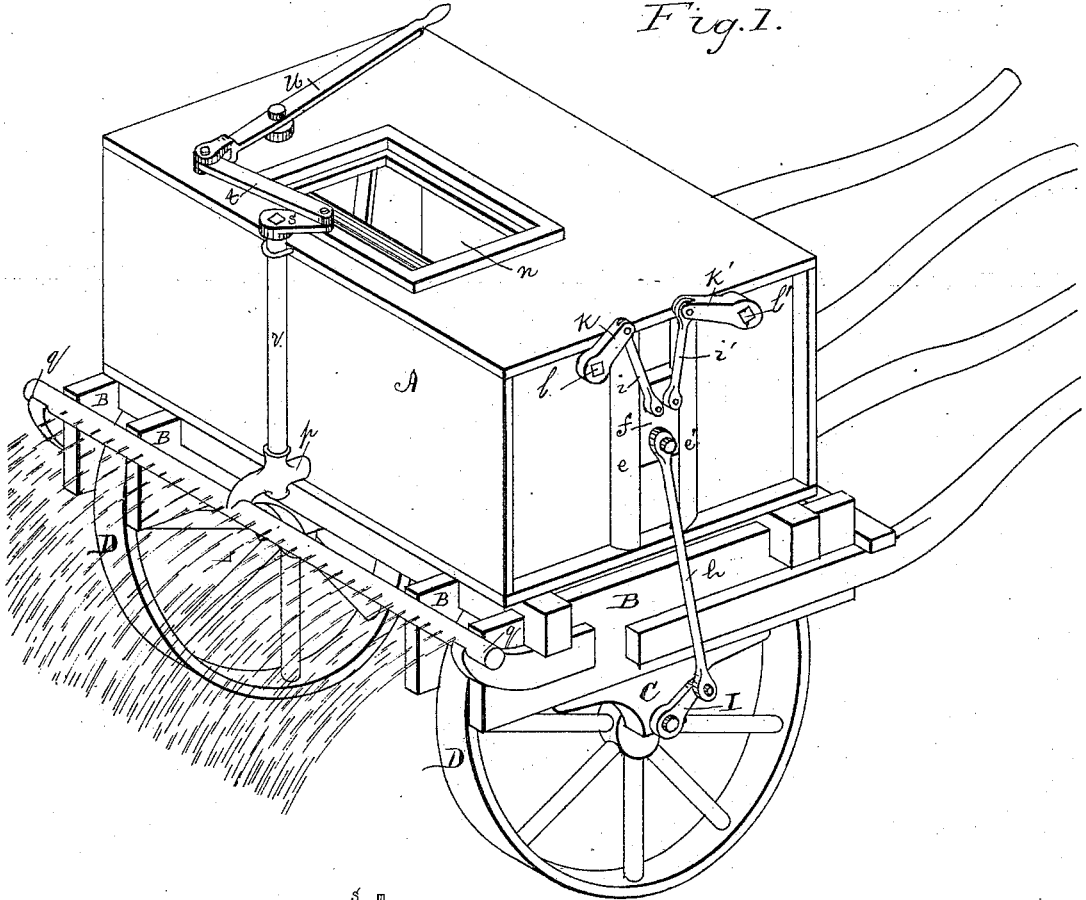
Figure 2:
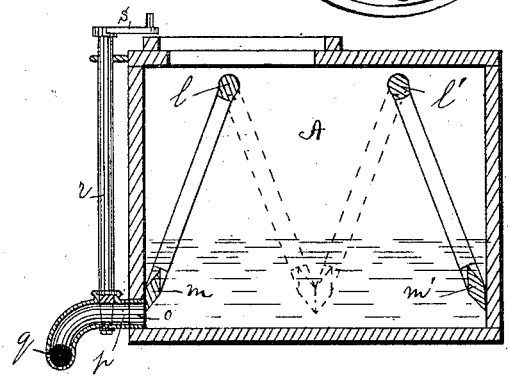

In the accompanying drawings, Figure 1 is a perspective view of our machine, and Fig. 2 a vertical cross-section of certain parts thereof.

The letter A designates a box or reservoir, which is secured to longitudinal timbers B, carrying journal-boxes C, in which the axle of the wheels D operate. One end of the box A is provided with a pair of vertical guides or slides, $e\ e'$, between which operates a sliding head, $f$, to which motion is imparted through a rod, $h$, and crank I, the latter keyed or otherwise secured to the projecting end of the axle, as shown. The sliding head aforesaid has also connected therewith a pair of links, $i\ i'$, the upper ends of which are pivoted to the outer ends of cranks $k\ k'$, that are secured to the projecting ends of the agitator-shafts $l\ l'$, having bearings in the ends of the box A. The shafts $l\ l'$ are each provided with downwardly-projecting arms, the extremities of which are connected by paddles, as shown at $m\ m'$, the vibration of which thoroughly mixes the liquid. The box A has an opening, $n$, in the top thereof for the introduction of the liquid, &c., which is afterward discharged through an opening, $o$, formed at the rear of the box and on a line with the bottom thereof. This opening is provided with a pipe, $p$, which connects with a horizontal perforated pipe, $q$, which is secured to the rear end of the machine in any desired manner. The pipe $p$ has a stop-valve fitted therein, said valve provided with a stem, $r$, having an arm, $s$, the end of which is connected by a link, $t$, with an operating-lever, U, the handle of which extends forward within reach of the driver.

Having described our invention, what we claim as new, and desire to secure by Letters Patent, is—

In a plant-sprinkler, the liquid-receptacle A, provided with suspended paddles $m\ m'$ and the guides $e\ e'$, in combination with the sliding head $f$ and means, substantially as described, for connecting the latter with the paddle-shafts and axle-crank, for the purpose set forth.

In testimony whereof we affix our signatures in presence of two witnesses.

DAVID THOMAS MERRICK.
WALTER TURNBULL COYLE.
WILLIAM LORIN BAILEY.

Witnesses:
S. C. DOWDEN,
W. D. DOWNING.